Feb. 6, 1968 — C. E. ELG — 3,367,435

FOUR WHEEL DRIVE VEHICLE

Filed Oct. 8, 1965 — 2 Sheets-Sheet 1

INVENTOR.
CARL E. ELG
BY Braddock & Burd
ATTORNEYS

Feb. 6, 1968   C. E. ELG   3,367,435
FOUR WHEEL DRIVE VEHICLE
Filed Oct. 8, 1965   2 Sheets-Sheet 2
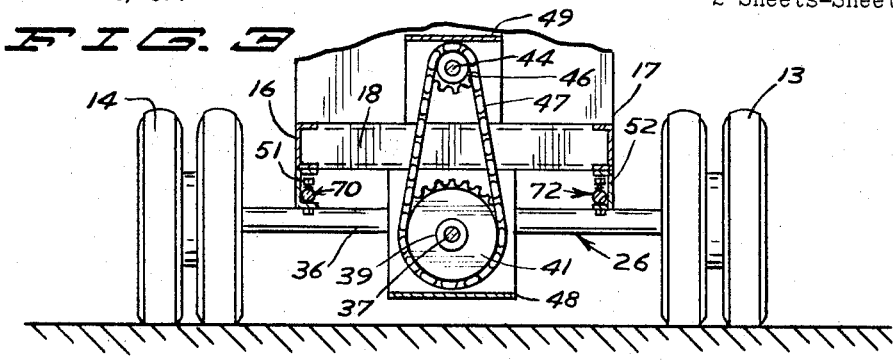
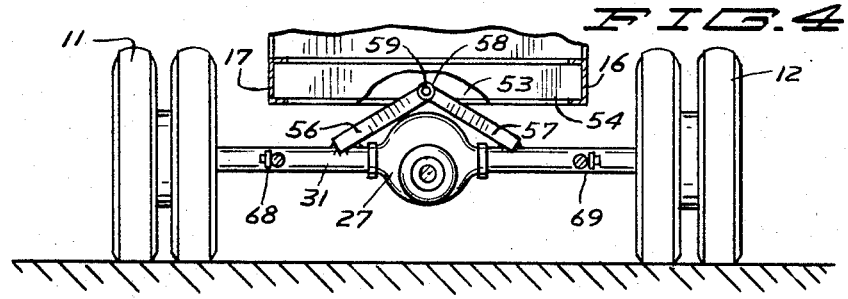
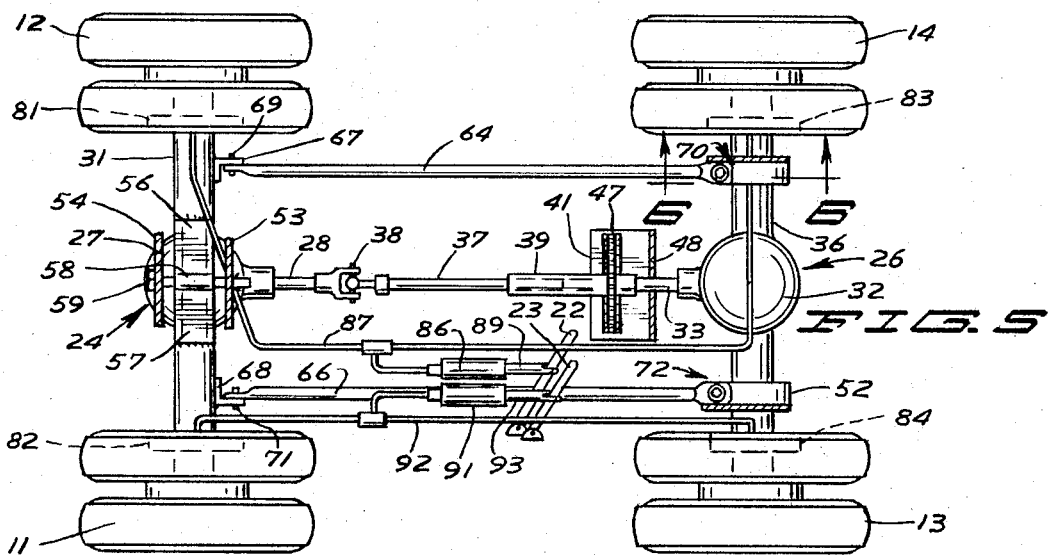
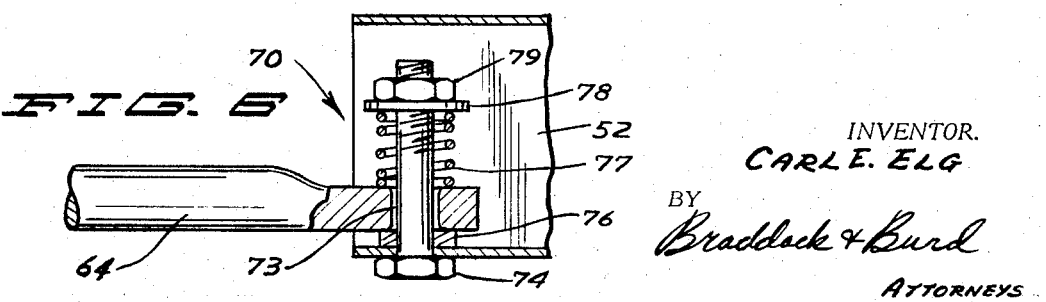
INVENTOR.
CARL E. ELG
BY Braddock & Burd
ATTORNEYS

United States Patent Office 3,367,435
Patented Feb. 6, 1968

3,367,435
FOUR WHEEL DRIVE VEHICLE
Carl Edwin Elg, c/o Carl Elg Garage,
Goodridge, Minn. 56725
Filed Oct. 8, 1965, Ser. No. 494,216
5 Claims. (Cl. 180—6.2)

ABSTRACT OF THE DISCLOSURE

A four wheel drive tractor having a longitudinal frame carrying an internal combustion engine and front and rear seats. A central longitudinal pivot pin connects a front wheel drive assembly to the front portion of the frame. A rear wheel drive assembly is directly connected to the bottom of a rear portion of the frame. Each of the drive assemblies have identical gear differentials connected to a common shaft. A chain and sprocket drive connects the shafts to the engine. Stabilizing rods located on opposite sides of the drive shaft are pivotally connected to the front wheel drive assembly and to a rear portion of the frame to stabilize the front wheel drive assembly and to allow limited rocking movement of the front wheel drive assembly. Separate hydraulic brake systems are associated with the front and rear wheels on each side of the tractor for steering and braking the tractor.

---

This invention relates to a four wheel drive vehicle and more particularly to a general purpose four wheel drive tractor having an improved power transmitting system and wheel support structure.

It is the object of the invention to provide a vehicle with an improved front wheel support assembly having limited rocking movement about a longitudinal axis.

Another object of the invention is to provide a four wheel drive vehicle with a single power transmitting system for the front wheels and the rear wheels in combination with a front wheel support and drive assembly having limited rocking movement about a longitudinal axis.

Still another object of the invention is to provide a vehicle with a front wheel drive assembly having limited rocking movement about a longitudinal axis in combination with stabilizing structure for maintaining the transverse position of the front wheel drive assembly.

A further object of the invention is to provide a four wheel drive vehicle having a front differential and a rear differential connected to a common drive shaft with separate braking systems capable of locking both front and rear wheels on the same side of the vehicle.

An additional object of the invention is to provide a four wheel drive vehicle having front and rear wheel support and drive assemblies which are sturdy in construction, economical in cost, and reliable in use.

Other objects and advantages of the invention are apparent upon reference to the following description and the accompanying drawing wherein:

FIGURE 3 is a sectional view taken along the line 3—3 of FIGURE 2;

FIGURE 4 is a sectional view taken along the line 4—4 of FIGURE 2;

FIGURE 5 is a plan view of the front and rear wheel drive assemblies and a diagrammatic illustration of the braking systems for the wheels on the opposite sides of the vehicle; and FIGURE 6 is an enlarged sectional view taken along the line 6—6 of FIGURE 5.

Figure 1:
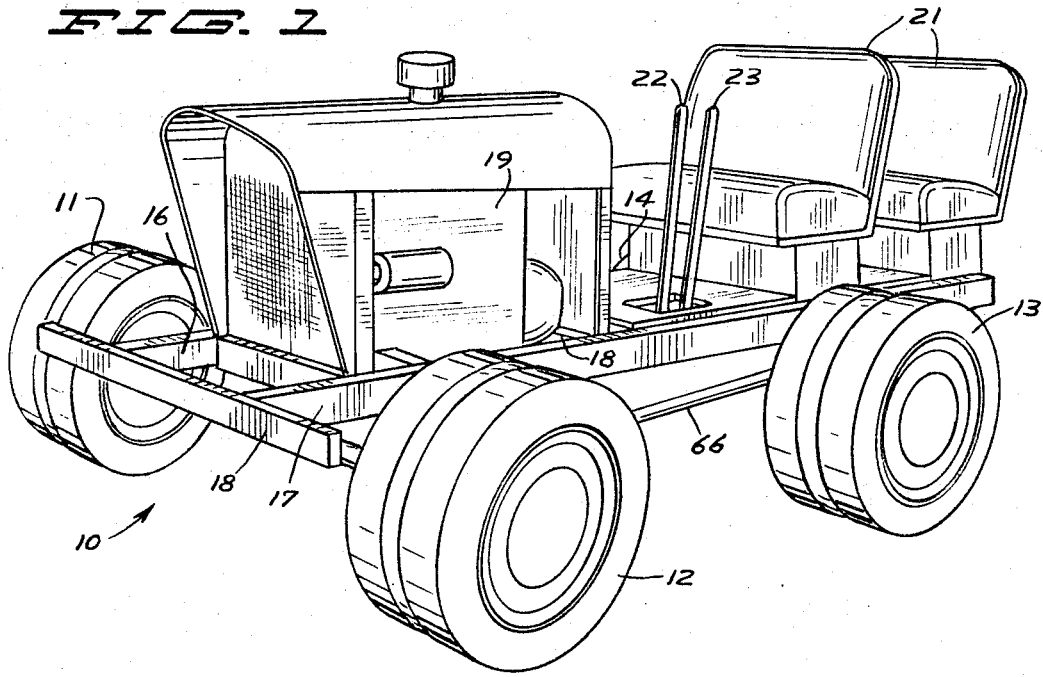
FIGURE 1 is a perspective view of the four wheel drive vehicle of this invention.

Referring to the drawings, there is shown in FIGURE 1, a four wheel drive vehicle of this invention indicated generally at 10 supported on the ground by a pair of front wheels 11 and 12 and a pair of rear wheels 13 and 14. The ground engaging area of the wheels is increased by making each wheel a dual tire unit. This enables the vehicle to be used on soft ground, such as bogs, marshes and the like. The vehicle has a horizontal frame comprising a pair of longitudinal frame members 16 and 17 secured together in side-by-side relation with a plurality of spaced transverse frame members 18. The frame is positioned between each pair of wheels and extends longitudinally of the vehicle. An engine 19 is supported on the transverse frame members 18 adjacent the front wheels. A pair of seats 21 are positioned on the frame members 17 and 18 adjacent the rear wheels 13 and 14. Extended upwardly from adjacent the frame member 17 convenient to a driver seated on the front seat 21 are a pair of brake levers 22 and 23 used to steer the vehicle.

Figure 2:
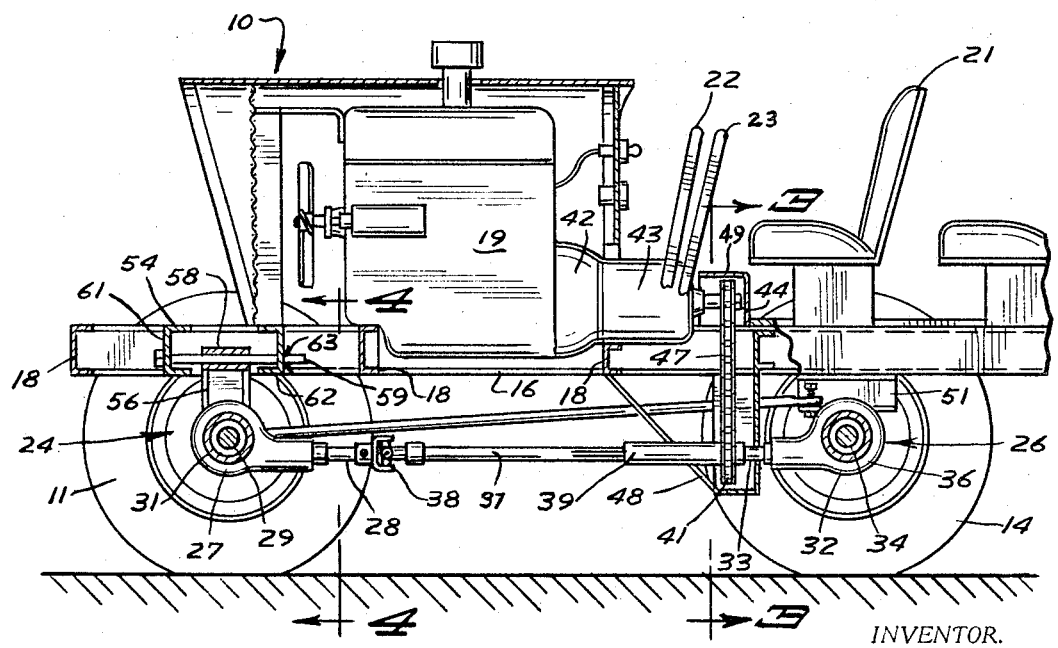
FIGURE 2 is a side elevation view of the vehicle of FIGURE 1 partly sectioned.

As shown in FIGURE 2, positioned below the front section of the frame is a transversely extended front wheel drive assembly 24 operably connected to the front drive wheels 12. The similar assembly 26 is positioned transversely across a rear section of the frame and is operatively connected to the rear wheels 13 and 14. The front drive assembly 24 has a differential gear unit 27 of conventional gear construction including a power input shaft 28 and oppositely projected axles 29 located within housing 31. The axles 29 are drivably connected to the opposite front wheels 11 and 12, respectively. The rear drive assembly 26 has a differential gear unit 32 having the same drive ratio as the differential gear unit 27. The gear unit 32 has a power input shaft 36 and oppositely projected axles 34 located within housing 36. The opposite ends of the axles 34 are drivably connected to the rear wheels 13 and 14, respectively.

The power input shafts 28 and 33 are in substantial longitudinal alignment and project towards each other. A drive draft 37 located between the input shafts 28 and 33 has one end connected to a universal coupling 38 secured to the end of the input shaft 28. A sleeve 39 telescoped over the opposite end of the drive shaft 36 drivably connects the drive shaft 37 with the power input shaft 33. A sprocket 41 is secured to the sleeve 39.

The power developed by the engine 19 is transmitted through a clutch 42 into a four speed transmission 43 having a power output shaft 44. Referring to FIGURE 3, secured to the shaft 44 is a drive sprocket 46 in alignment with the driven sprocket 41. Trained over the sprockets 41 and 46 is a roller link chain 47 drivably coupling the output shaft 44 of the transmission with the common drive shaft 37 connecting the front and rear differential gear units 27 and 32, respectively. Sprocket 41 is larger than sprocket 46 and has a drive ratio of about 2½ to 1.

As shown in FIGURE 2, the sprockets 41 and 46 as well as the chain 47 are enclosed within a housing 48 projected downwardly from the frame members 16, 17 and 18 and by an upwardly extended shield 49. The forward section of the housing 48 projects downwardly and rearwardly on opposite sides of the drive shaft 37 preventing material, such as grass and weeds, from being caught in the chain and sprockets. To prevent the material from being caught in the universal coupling 38, the coupling may be enclosed in a flexible shroud or similar shielding member.

Referring to FIGURE 3, the rear wheel drive assembly 26 extends transversely of the frame members 16 and 17 and is secured to the rear wheels 13 and 14 on opposite sides of the frame members. Channel members 51 and 52 are secured to the bottom flanges of the frame members 16 and 17 and project downwardly therefrom. The lower flanges of the channel members 51 and 52 are secured by welds or the like to opposite portions of the drive assembly housing 36 positively mounting the rear wheel drive assembly on the frame members 16 and 17.

The pivotal support for the front drive assembly 24 is shown in FIGURES 2 and 4. Extended transversely between the frame members 16 and 17 are a pair of longitudinally spaced cross beams 53 and 54 providing support structure for the front wheel drive assembly. Secured to the top of the housing 31 over the differential gear unit 27 are a pair of upwardly converging channel members 56 and 57 having adjacent ends secured to and embracing a longitudinally extended sleeve 58. A pin 59 projects longitudinally through the bore in the sleeve 58 and through longitudinally aligned holes 61 and 62 in the cross beams 53 and 54. A cotter pin 63 located in a hole in the forward end of the pin 59 holds the pin 59 in assembled relation with the cross beams 52 and 53 and the sleeve 58. The sleeve 58 being rotatably mounted on the pin 59 permits limited rocking movement of the front wheel drive assembly 24 about a longitudinal axis. This allows the front wheels 11 and 12 to follow the contour of the ground enabling them to have maximum traction characteristics.

As shown in FIGURE 5, the front wheel drive assembly 24 is transversely stabilized with a pair of longitudinally extended struts 64 and 66 located on opposite sides of the drive shaft 37. The forward ends of the struts 64 and 66 are pivotally connected to the housing 31 for movement about transverse axes. The pivotal connections are a pair of upright angle members 67 and 68 secured to opposite rear portions of the housing 31. Pins 69 and 71 project through suitable holes in the angle members and struts to pivotally join each strut to the adjacent angle member.

The opposite ends of the struts 64 and 66 are pivotally connected to the channel members 51 and 52 by joint assemblies 70 and 72, respectively. The joint assemblies 70 and 72 are identical in construction and permit the struts 64 and 66 to have limited upright movement as well as limited pivotal movement. The following description is limited to joint assembly 70 shown in detail in FIGURE 6. The rear-end section of the strut 64 is flattened and has an upright hole 73 accommodating an upwardly projected bolt 74 extended through a hole in the bottom flange of the channel member 52. A washer 76 is interposed between the bottom flange of the channel member 52 and the end of the strut 64. Positioned concentrically about the bolt 74 and engageable with the top of the strut 64 is a coil spring 77 abutting a washer 78 and compressed by a nut 79 threaded on the end of the bolt 74. The spring 77 permits the strut 64 to have limited upright movement. The hole 73 being larger than the diameter of the bolt 74 permits the strut 64 to have limited pivotal movement about a transverse axis.

The steering of the vehicle is accomplished by separate brake systems which are operable to selectively lock either the left or right wheels allowing the unlocked wheels to turn the vehicle. The brake systems include conventional brake drums and brake shoe units 81, 82, 83 and 84 in each of the wheels. A master cylinder and reservoir unit 86 is connected by a fluid line 87 to the brake actuating elements of the brake shoe units 81 and 83. The master cylinder and fluid reservoir unit 86 has a piston 89 pivotally connected to a lower portion of the hand lever 22 so that movement of the lever will actuate the brake shoe units 81 and 83 on the right side of the vehicle. A similar master cylinder and fluid reservoir unit 91 is coupled with a fluid line 92 leading to the actuators of the brake shoe units 82 and 84 on the left wheels 11 and 13. The unit 91 has a piston 93 pivotally connected to the hand lever 23. Movement of the hand lever 23 actuates the master cylinder and fluid reservoir unit 91 to apply pressure to the brake fluid in the line 92 and thereby actuate the brakes of the units 82 and 84 thereby locking the left wheels 11 and 13. The vehicle can be steered in either direction without interrupting the drive to the front and rear wheel assemblies 24 and 26. The selective locking of the wheels on the opposite sides of the vehicle does not interfere with the drive as the differential gear units 27 and 32 transmit the torque to the unlocked wheels.

While there have been shown and described the novel features of the invention as applied to a preferred embodiment it is to be understood that various omissions, substitutions, changes in shape and details of the structure illustrated may be made by those skilled in the art without departing from the spirit of the invention. The invention is to be limited only as indicated by the scope of the following claims.

I claim:
1. In a vehicle having an engine driving a power output shaft the combination of:
 (a) frame means extended longitudinally of the vehicle for supporting said engine,
 (b) front drive wheels located on opposite sides of the forward section of the frame means,
 (c) a front wheel drive assembly extended transversely of the forward section of the frame means and connected to the front drive wheels, said drive assembly having a differential gear unit and a rearwardly projected power input shaft,
 (d) longitudinal pivot means connecting the mid-portion of the front wheel drive assembly to the frame means providing the front wheel drive assembly with limited rocking movement about a longitudinal axis,
 (e) rear drive wheels located on opposite sides of the rear section of the frame means,
 (f) a rear wheel drive assembly extended transversely of and secured to the frame means, said rear wheel drive assembly having a differential gear unit connected to the rear drive wheels and a forwardly projected power input shaft,
 (g) drive shaft means connected to the front wheel power input shaft and to the rear wheel power input shaft,
 (h) power transmitting means drivably connecting the drive shaft means with the engine power output shaft whereby the engine rotates the drive shaft means which in turn operates both the front differential gear unit and the rear differential gear unit simultaneously driving the front wheels and the rear wheels, and
 (i) longitudinal strut members located below the frame means on opposite sides of the differential gear units,
 (j) transverse pivot means connecting the forward ends of the strut members to opposite portions of the front wheel drive assembly, said transverse pivot means having transverse horizontal axes whereby the front wheel drive assembly is free to rock about the longitudinal axis of the longitudinal pivot means, and
 (k) joint means connecting the rear sections of the strut members to portions of the frame means secured to opposite portions of the rear wheel drive assembly, said joint means having upright members coacting with the strut members allowing limited upright movement of the strut members whereby the strut members provide the front wheel drive assembly with transverse stability with a minimum interference with its limited rocking movement.

2. The vehicle structure defined in claim 1 wherein said power transmitting means comprises:
 (a) vertically aligned sprockets mounted on the drive shaft means and the engine power output shaft, and
 (b) chain means trained over said vertically aligned sprockets drivably connecting the drive shaft means with the engine power output shaft.

3. The vehicle structure defined in claim 1 including:

(a) a first braking system coupled to a front wheel and a rear wheel on one side of the vehicle operable to lock said wheels so that the differential drive units transmit power to the drive wheels on the opposite side of the vehicle thereby changing the direction of movement of the vehicle, and (b) second brake system coupled to the front wheel and rear wheel on the opposite side of the vehicle for locking said wheels.

4. The vehicle structure defined in claim 1 wherein said differential gear unit of the front wheel drive assembly has the same drive ratio as the differential gear unit of the rear wheel drive assembly.

5. The vehicle structure defined in claim 1 wherein said strut members are spaced from and extend generally parallel to the drive shaft means.

References Cited

UNITED STATES PATENTS

| | | | |
|---|---|---|---|
| 1,375,882 | 4/1921 | Wilson | 180—6.2 |
| 1,774,451 | 8/1930 | Norelius | 180—6.2 |
| 2,560,384 | 7/1951 | Crain | 180—49 |
| 2,625,231 | 1/1953 | Martin | 180—49 |
| 3,115,205 | 12/1963 | Ewin | 180—49 |

FOREIGN PATENTS

| | | |
|---|---|---|
| 844,409 | 7/1952 | Germany. |
| 679,122 | 9/1952 | Great Britain. |

LEO FRIAGLIA, *Primary Examiner.*

BENJAMIN HERSH, *Examiner.*

J. A. PEKAR, *Assistant Examiner.*